(12) United States Patent
Tsubone

(10) Patent No.: US 10,838,593 B2
(45) Date of Patent: Nov. 17, 2020

(54) DISPLAY SYSTEM

(71) Applicant: Panasonic Intellectual Property Management Co., Ltd., Osaka (JP)

(72) Inventor: Takashi Tsubone, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/430,357

(22) Filed: Jun. 3, 2019

(65) Prior Publication Data

US 2019/0286292 A1  Sep. 19, 2019

Related U.S. Application Data

(63) Continuation of application No. PCT/JP2017/035897, filed on Oct. 3, 2017.

(30) Foreign Application Priority Data

Dec. 26, 2016 (JP) ................... 2016-250338

(51) Int. Cl.
*G06F 3/048* (2013.01)
*G06F 3/0484* (2013.01)
*G06F 3/14* (2006.01)
*B60R 11/02* (2006.01)
*G06F 3/0481* (2013.01)

(52) U.S. Cl.
CPC ............ *G06F 3/0484* (2013.01); *B60R 11/02* (2013.01); *G06F 3/0481* (2013.01); *G06F 3/14* (2013.01); *G06F 3/1423* (2013.01)

(58) Field of Classification Search
None
See application file for complete search history.

(56) References Cited

U.S. PATENT DOCUMENTS

2003/0103078 A1* 6/2003 Burns ................... G06Q 20/18
715/739
2012/0117495 A1* 5/2012 Sirpal ................... G06F 1/1616
715/761

FOREIGN PATENT DOCUMENTS

JP     6-332652    12/1994
JP  2006-027579     2/2006
(Continued)

OTHER PUBLICATIONS

International Search Report of PCT application No. PCT/JP2017/035897 dated Dec. 12, 2017.

*Primary Examiner* — William C Trapanese
(74) *Attorney, Agent, or Firm* — Greenblum & Bernstein, P.L.C.

(57) ABSTRACT

While a first display unit is caused to display a first user interface created with a first layout pattern for a first application, when a display operation of moving the user interface for the first application to a second display unit is performed, a CPU determines, based on attributes of the first display unit and the second display unit, a first movement amount used to move and display the first user interface on the first display unit, and a second movement amount used to move and display a second user interface on the second display unit. The CPU causes the first user interface to move and appear at a first movement amount on the first display unit, and causes the second user interface to move and appear at the second movement amount on the second display unit.

6 Claims, 12 Drawing Sheets

(56) References Cited

FOREIGN PATENT DOCUMENTS

| | | |
|---|---|---|
| JP | 2006-103450 | 4/2006 |
| JP | 2010-244267 | 10/2010 |
| JP | 2016-076070 | 5/2016 |
| JP | 2016-186733 | 10/2016 |
| WO | 2016/059677 | 4/2016 |

* cited by examiner

FIG. 3

|  | First display unit | Second display unit |
|---|---|---|
| Application 1 | Layout 1-1 | Layout 1-2 |
| Application 2 | Layout 2-1 | Layout 2-2 |
| Application 3 | Layout 3-1 | Layout 3-2 |
| Application 4 | Layout 4-1 | Layout 4-2 |
| Application 5 | Layout 5-1 | Layout 5-2 |

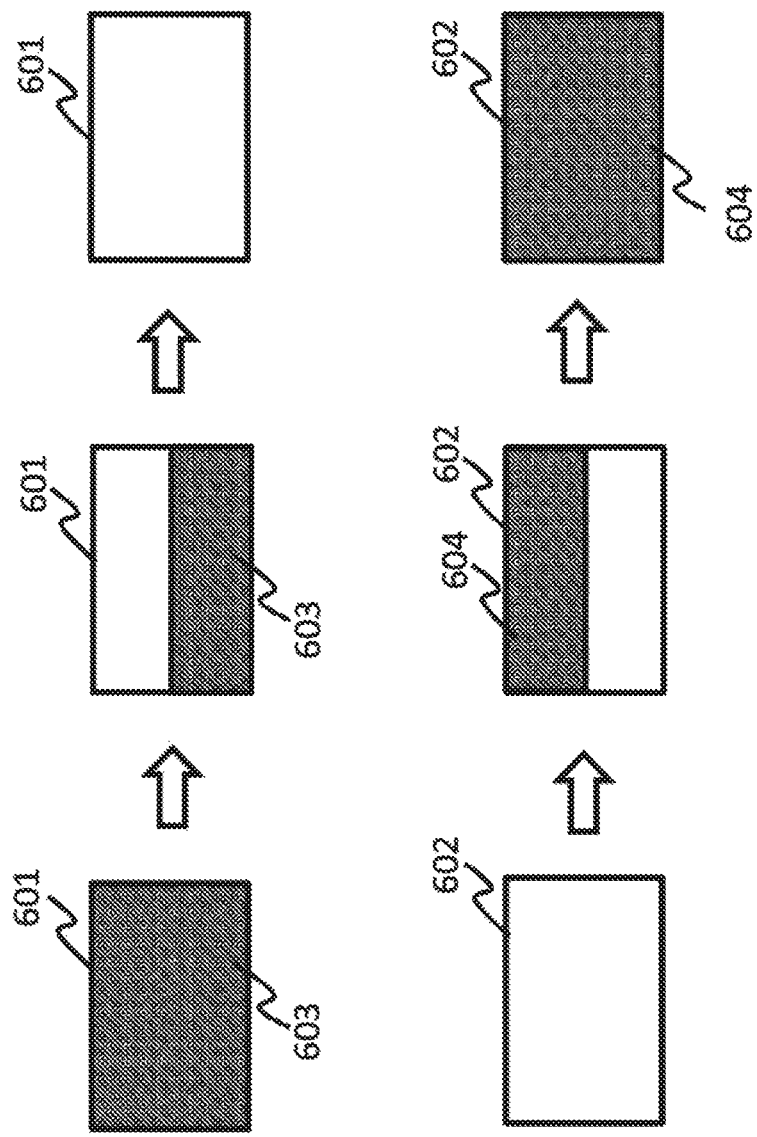

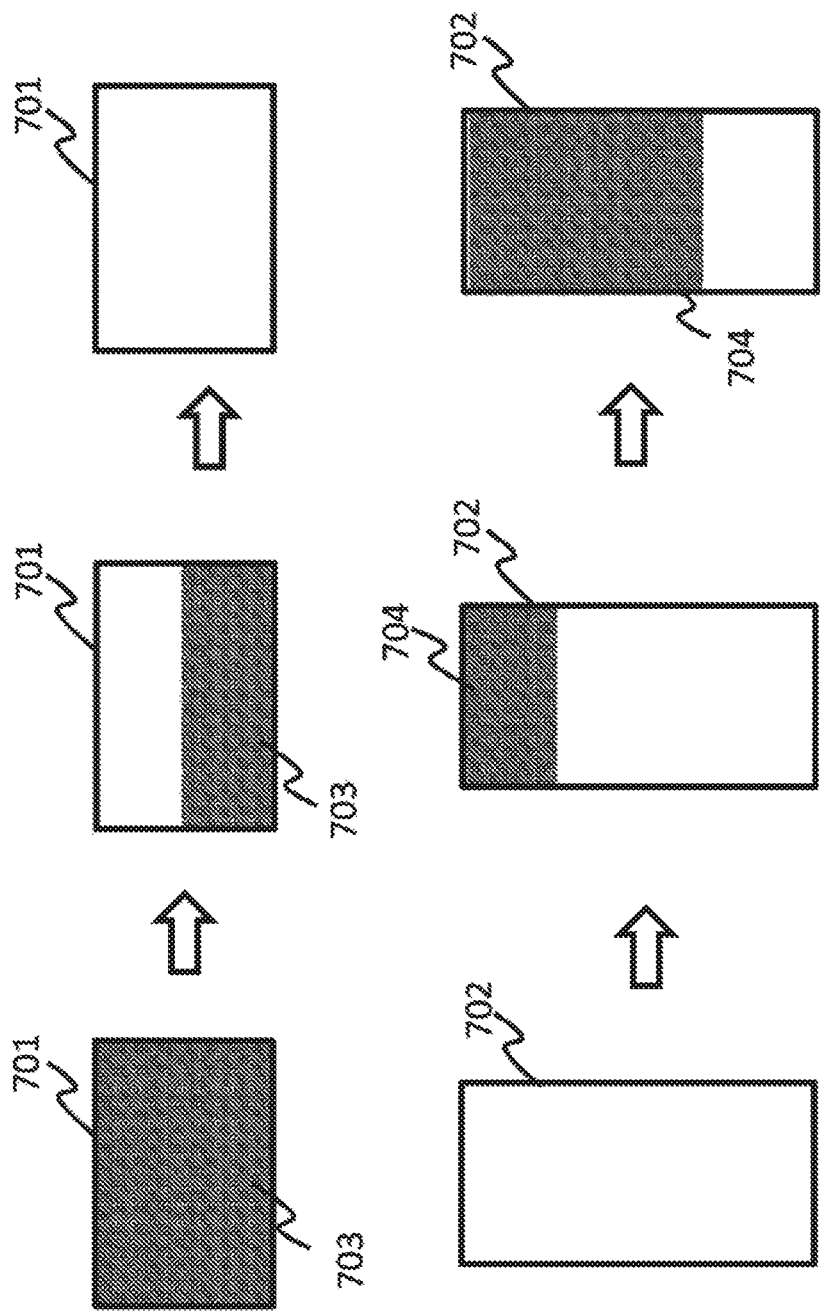

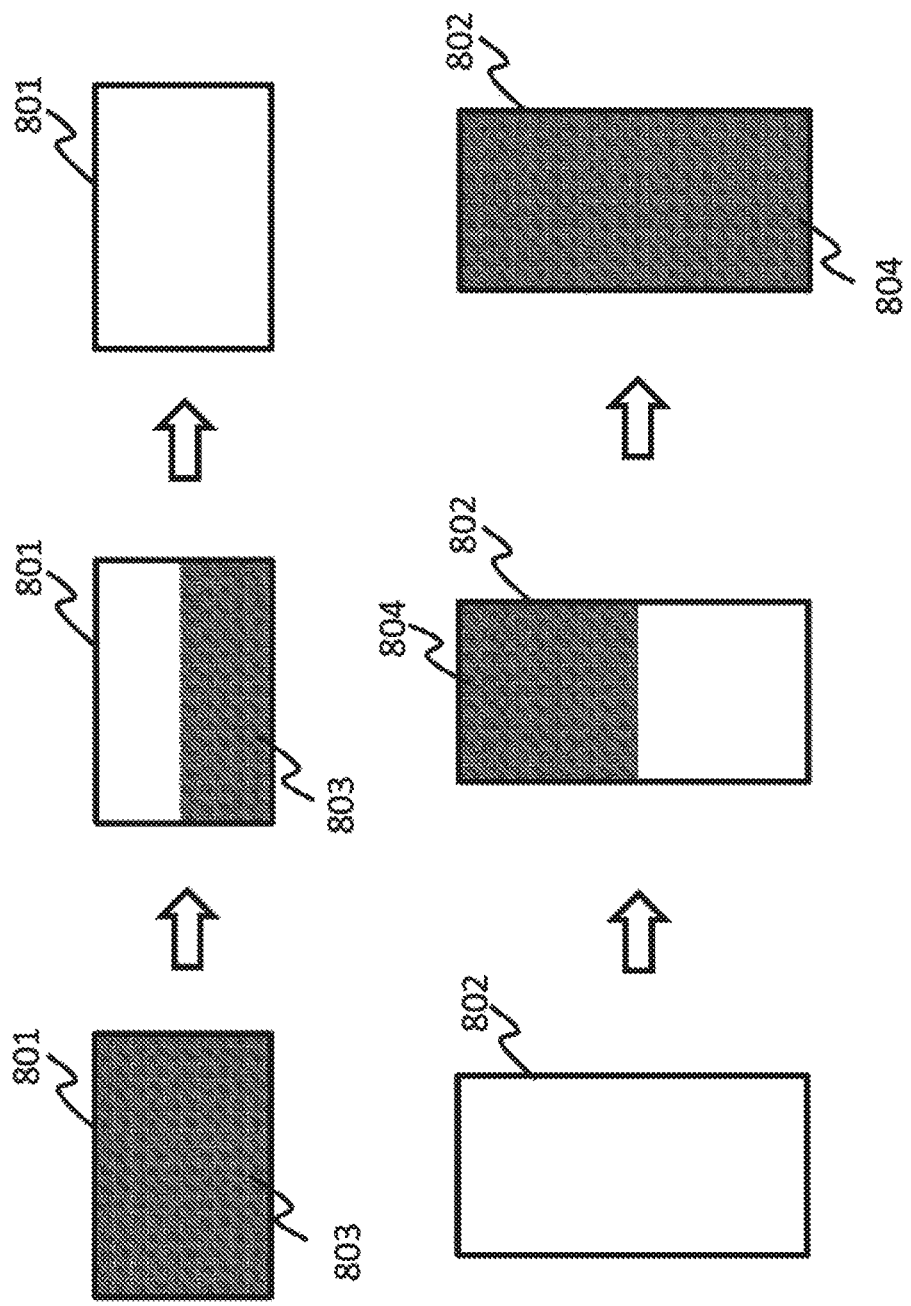

FIG. 9C
FIG. 9D
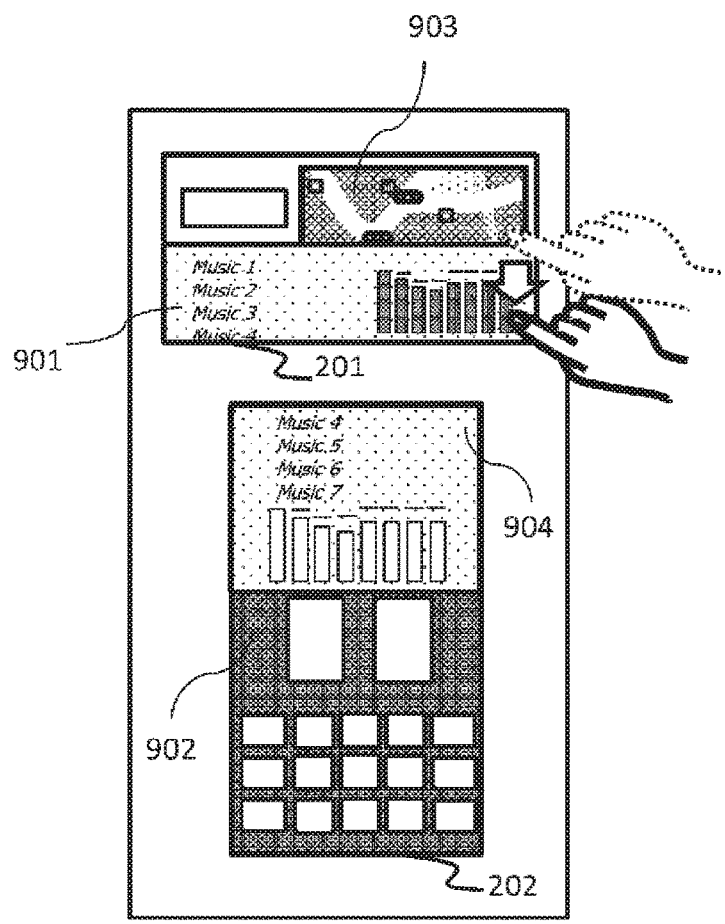
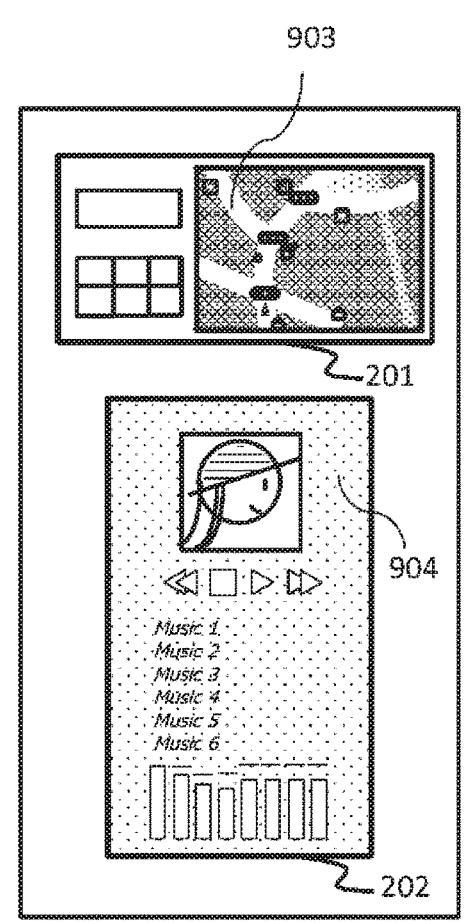

DISPLAY SYSTEM

CROSS-REFERENCE TO RELATED APPLICATIONS

This application is a continuation of the PCT International Application No. PCT/JP2017/035897 filed on Oct. 3, 2017, which claims the benefit of foreign priority of Japanese patent application No. 2016-250338 filed on Dec. 26, 2017, the contents all of which are incorporated herein by reference.

TECHNICAL FIELD

The present disclosure relates to a display system including a plurality of display units, and a method for controlling the display system.

BACKGROUND ART

PTL 1 discloses an in-vehicle audiovisual (A/V) system provided with a plurality of display units in a vehicle. In this in-vehicle A/V system, in a case where the plurality of display units displays a same source, any one of the display units is given a function (priority) to preferentially operate the source. This in-vehicle A/V system prevents the display content on the display unit to which the priority is given from being impaired by the operation of the display unit to which the priority is not given.

PTL 2 discloses a device for controlling multiple monitors in a vehicle. The device is provided with a front monitor and a rear monitor in the vehicle. The front monitor is arranged around a driver. The rear monitor is arranged around a rear seat. According to the device for controlling multiple monitors in a vehicle, an AV device such as a digital versatile disk (DVD) player that enables viewing on the rear monitor can be safely operated through the front monitor even while the vehicle is traveling.

CITATION LIST

Patent Literature

PTL 1: Unexamined Japanese Patent Publication No. 2006-27579

PTL 2: Unexamined Japanese Patent Publication No. 2006-103450

SUMMARY OF THE INVENTION

The present disclosure provides a display system including a plurality of display devices having different attributes, and a display method. With the display system, when a user interface is moved from one of the display devices to another one of the display devices, the user interface is displayed with a layout changed in accordance with the other one of the display devices.

The display system according to the present disclosure includes a first display unit, a second display unit, an application, a layout table, and a controller. The layout table is stored with a first layout pattern that is associated to a first user interface for the application, and that is used to display the first user interface on the first display unit, and a second layout pattern that is associated to a second user interface for the application, and that is used to display the second user interface on the second display unit. The controller is configured to use the layout table to create with the first layout pattern a first content, and, while the first content is displayed in the first user interface on the first display unit, when a display operation of moving the first user interface to the second display unit is performed, to use the layout table to create with the second layout pattern a second content used to display the second user interface on the second display unit. The controller is further configured to determine, based on attributes of the first display unit and attributes of the second display unit, a first movement amount used to move and display the first user interface on the first display unit, and a second movement amount used to move and display the second user interface on the second display unit. The first user interface is caused to move and appear at a first movement amount on the first display unit, and the second user interface is caused to move and appear at a second movement amount on the second display unit.

The present disclosure can provide a display system including a plurality of display devices having different attributes. The display system is capable of causing, when a user interface is moved between the display devices, the user interface moves and appears smoothly and seamlessly.

BRIEF DESCRIPTION OF DRAWINGS

FIG. 3 is a view illustrating an example of a layout table according to the first exemplary embodiment of the present disclosure.

FIG. 6 is a view for describing relationships between resolution and movement amounts on display units.

FIG. 7 is a view for describing relationships between resolution and movement amounts on display units.

FIG. 8 is a view for describing relationships between resolution and movement amounts on display units.

FIG. 9C is a view for describing the specific example of the operation on the display system according to the first exemplary embodiment of the present disclosure.

FIG. 9D is a view for describing the specific example of the operation on the display system according to the first exemplary embodiment of the present disclosure.

DESCRIPTION OF EMBODIMENTS

Hereinafter, exemplary embodiments will be described in detail with reference to the drawings as appropriate. However, detailed descriptions more than necessary may be omitted. For example, detailed descriptions of well-known matters and duplicate descriptions of substantially identical configurations may be omitted. Such omissions are for avoiding unnecessary redundancy in the following description and for facilitating understanding by those skilled in the art.

Note that the attached drawings and the following description are provided for those skilled in the art to fully understand the present disclosure, and are not intended to limit the subject matter as described in the appended claims.

First Exemplary Embodiment

A first exemplary embodiment will be described with reference to FIGS. 1 to 10.

1. Outline

Outline of the display system and the method for controlling the display system, according to the first exemplary embodiment, will be described herein with reference to, as a specific example, a case when the display system according to the present disclosure is mounted on a vehicle.

For example, the display system includes a first display unit and a second display unit both provided around a driver's seat. For example, when the first display unit outputs a medium player application (hereinafter referred to as a player application), a user interface being displayed on the player application can be moved to the second display unit. When the user interface being displayed for the player application is moved from the first display unit to the second display unit, a layout and a movement amount in accordance with attributes of the first display unit and the second display unit are taken into account for displaying.

As described above, in the display system according to the first exemplary embodiment, the display units have various cooperation relationships with each other. Therefore, when a user interface for an application is displayed on one of the display units, the user interface can be moved to another one of the display units smoothly and seamlessly. Therefore, functionality of the whole system can be improved. With layout patterns conforming to attributes of the display units, functions of an application can be presented in accordance with each of the display units.

2. Configuration

[2-1. Outer Appearance of Entire Display System]

Figure 1:
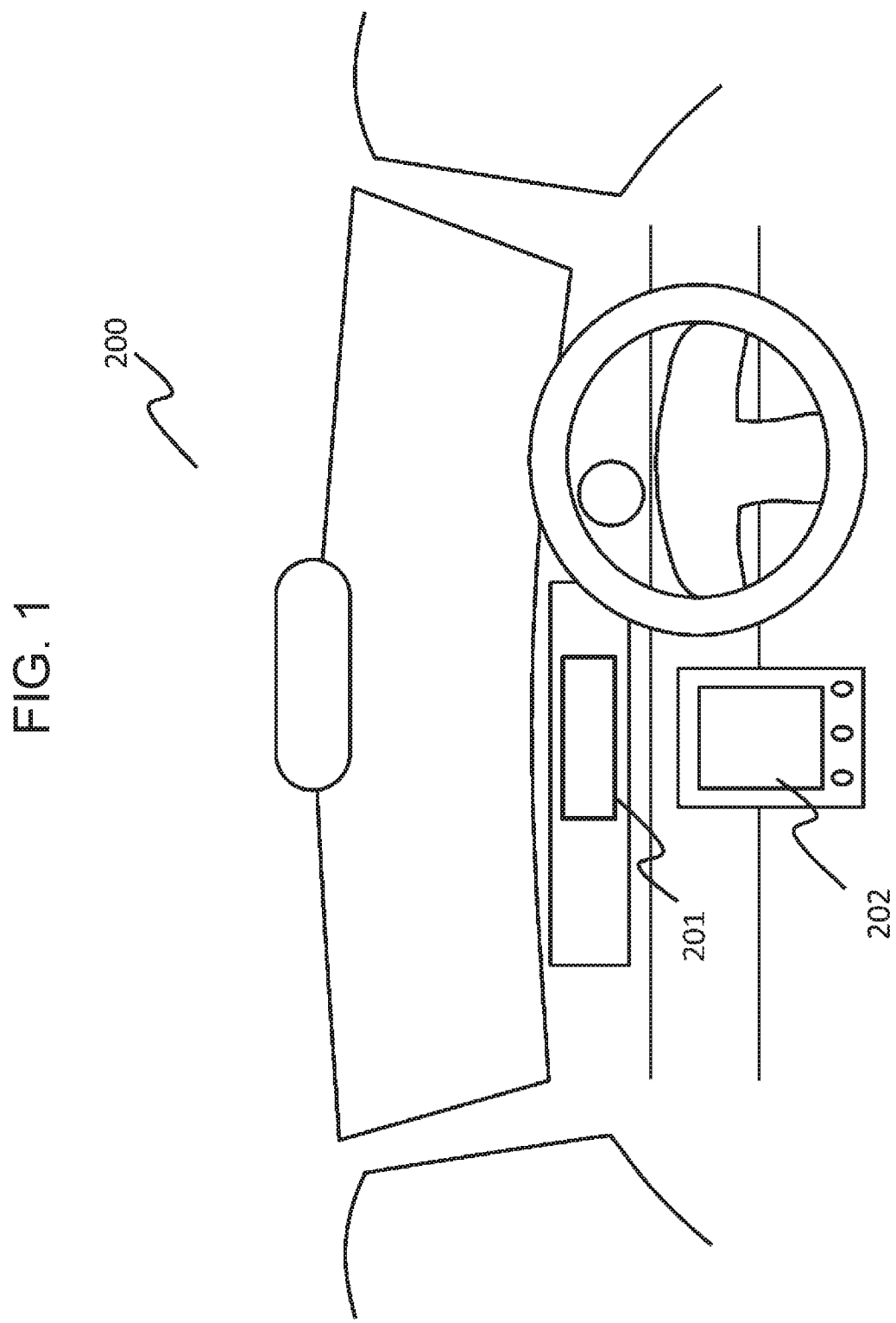
FIG. 1 is a view illustrating an outer appearance of an entire display system according to a first exemplary embodiment of the present disclosure, when the display system is mounted on a vehicle.

FIG. 1 is a view illustrating an outer appearance of an entire display system according to the first exemplary embodiment, when the display system is being mounted.

Around a driver's seat of vehicle 200, display device 201 and display device 202 are provided as display units.

Display device 201 is a horizontal type, and disposed below a front glass. Display device 201 is used by a user seated on the driver's seat.

Display device 202 is a vertical type, and disposed below display device 201. Display device 202 is also used by the user seated on the driver's seat. Display device 202 has attributes different from attributes of display device 201.

In FIG. 1, the number of the display devices being provided is two. However, the number of display devices is not limited to two.

[2-2. Electric Configuration of Display System]

Figure 2:
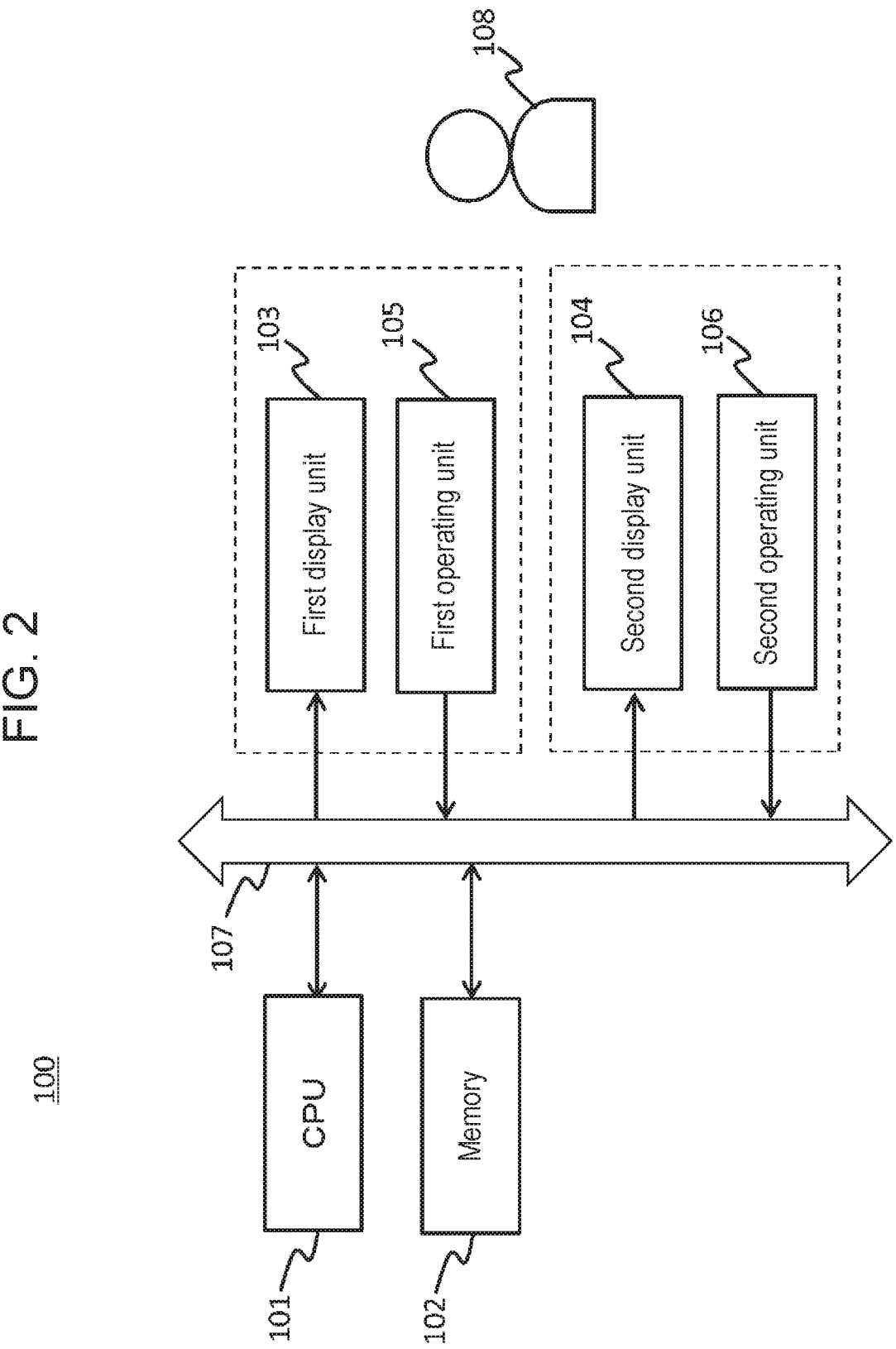
FIG. 2 is a block diagram illustrating an electric configuration of the display system according to the first exemplary embodiment of the present disclosure.

FIG. 2 is a block diagram illustrating an electric configuration of the display system according to the first exemplary embodiment.

Display system 100 according to the first exemplary embodiment includes central processing unit (CPU) 101 serving as a controller, memory 102, first display unit 103, second display unit 104, first operating unit 105, and second operating unit 106. The components are coupled to transmission path 107. The components are disposed at predetermined positions on vehicle 200 in FIG. 1. First display unit 103 and second display unit 104 respectively correspond to display device 201 and display device 202 in FIG. 1.

First display unit 103, second display unit 104, first operating unit 105, and second operating unit 106 are disposed adjacent to user 108, and used by user 108.

CPU 101 includes a non-volatile memory storing a program, a volatile memory configured to provide a temporal storage area for executing a program such as an application, an input/output port, and a processor configured to execute the program, for example. CPU 101 executes an application using memory 102. CPU 101 is configured to determine a destination of display of a user interface for an application being executed, a layout pattern used when the user interface for the application is displayed, and a movement amount for the user interface being displayed for the application, for example. CPU 101 controls how contents are to be output and displayed on first display unit 103 and second display unit 104 according to various signals. Various signals at least include a content of a display operation entered with first operating unit 105, a content of a display operation entered with second operating unit 106, attributes of first display unit 103, attributes of second display unit 104, a type of a user interface being displayed on first display unit 103 for an application, and a type of a user interface being displayed on second display unit 104 for the application. CPU 101 generates contents to be displayed on first display unit 103 and second display unit 104 by using memory 102.

Memory 102 is used as a work memory for CPU 101. Memory 102 includes a volatile memory such as a dynamic random access memory (DRAM), and a non-volatile memory such as a flash memory. Memory 102 stores various signals. Various signals are signals indicative of the attributes of first display unit 103 and second display unit 104, types of user interfaces for applications being executed in first display unit 103 and second display unit 104, and contents of operations performed by user 108 with first display unit 103 and second display unit 104, for example. Attributes of the display units include specifications on display, such as resolution, shape, and inch count. Memory 102 also includes a frame memory for data of videos to be displayed on first display unit 103 and second display unit 104. Memory 102 also stores a layout table with the display units, user interfaces to be displayed for applications on the display units, and layout patterns that are used when the user interfaces are displayed for the applications on the display units being associated to each other. Memory 102 also stores information indicative of relationships of installation positions of the display units. In the present disclosure, first display unit 103 and second display unit 104 have a vertical positional relationship. First display unit 103 lies above second display unit 104. Second display unit 104 lies below first display unit 103.

First display unit 103 and second display unit 104 are display devices each having a display screen such as a liquid crystal display (LCD).

First operating unit 105 is used by a user to enter instructions on various operations when the user uses an application output on first display unit 103. Second operating unit 106 is used by the user to enter various operations when the user uses an application output on second display unit 104. Various operations include turning on/off of a power source, sound volume adjustments in accordance with applications, selecting and playing an audiovisual (AV) content, for example, and a display operation of moving and displaying a user interface for an application related to the first exemplary embodiment, for example. Signals indicating the various operations described above are input to CPU 101. First operating unit 105 and second operating unit 106 correspond to operation keys provided to a remote controller or first and second display units 103 and 104, and touch panels, for example, provided to first and second display units 103 and 104. When function parts displayed on first display unit 103 and second display unit 104 are operated, the touch panels display user interfaces linked to functions entered in first operating unit 105 and second operating unit 106.

Transmission path 107 is a transmission path used for communication among respective components. That is, CPU 101, memory 102, first display unit 103, second display unit 104, first operating unit 105, and second operating unit 106 are coupled to transmission path 107, and communicate with each other by wire. As transmission path 107, a transmission path complying with a high-definition multimedia interface (HDMI) (registered trademark) standard or media oriented systems transport (MOST) capable of transmitting a video and sound is used, for example. In addition, a transmission path for control signals may be separately provided for communication of control signals.

[2-3. Layout Table]

FIG. 3 is a view illustrating an example of the layout table.

Applications 1 to 5 are pieces of software to be executed via the first display unit or the second display unit. Applications include player applications such as television (TV), digital versatile disc (DVD) player, and radio, a car navigation application, and an air conditioner setting application, for example.

Layouts 1-1 to 5-2 represent layout patterns each used when a user interface is displayed on first display unit 103 or second display unit 104. For example, layout 1-1 represents a layout pattern when a user interface for application 1 is displayed on first display unit 103. A layout pattern is information indicative of which of a plurality of functions included in an application is displayed at which position on a user interface displayed on a display unit. That is, even a single application provides a separate layout pattern that differs in the number of functions to be provided and arrangement of function parts depending on a display unit. A layout pattern is set in accordance with attributes such as shape of display unit (vertical type or horizontal type), resolution, inch count, and arrangement set beforehand by user 108, for example.

Specific examples of layout patterns will be described herein.

Figure 4A:
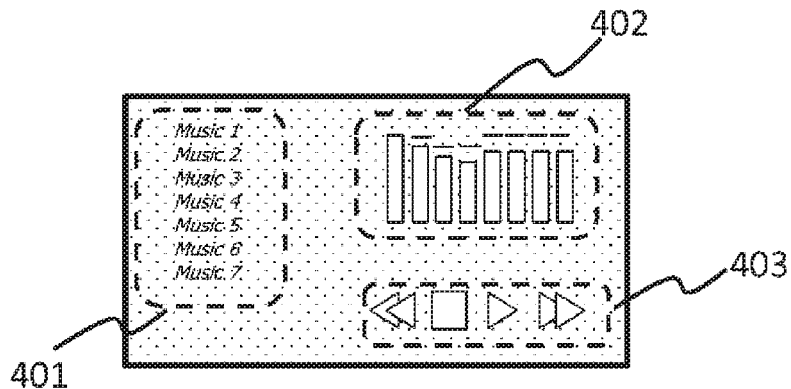
FIG. 4A is a view illustrating an example of a layout pattern on a first display unit.
Figure 4B:
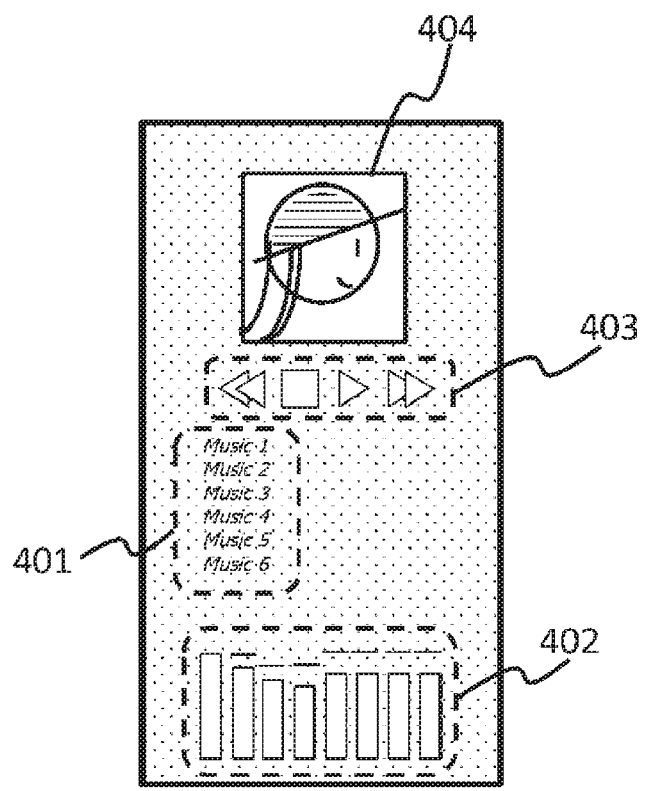
FIG. 4B is a view illustrating an example of a layout pattern on a second display unit.

FIG. 4A is a view illustrating an example of a layout pattern on first display unit 103. FIG. 4B is a view illustrating an example of a layout pattern on second display unit 104. Specifically, FIG. 4A is an example of a layout pattern of layout 1-1. FIG. 4B is an example of a layout pattern of layout 1-2.

For example, a user interface for application 1 represents a player application, and includes four functions of track name display, sound volume display, operation content display, and player medium image display. In this case, layout 1-1 represents a layout pattern where parts 401 to 403 indicative of three functions of track name display, sound volume display, operation content display are arranged on first display unit 103, as illustrated in FIG. 4A. Layout 1-2 represents a layout pattern where parts 401 to 404 indicative of four functions of track name display, sound volume display, operation content display, and player medium image display are arranged on second display unit 104, as illustrated in FIG. 4B. Parts to be displayed may differ depending on an attribute of a display unit.

3. Operation

How the display system according to the first exemplary embodiment operates will be described.

[3-1. Mode of Display Operation]

A display operation according to the first exemplary embodiment will be described.

In the first exemplary embodiment, a standard state denotes a state where first display unit 103 displays a first user interface created with a first layout pattern for a first application, and second display unit 104 displays a third user interface created with a third layout pattern for a second application. The first user interface and the third user interface are examples of user interfaces. As for display operations, first display unit 103 and second display unit 104 illustrate examples corresponding to either of display device 201 and display device 202 in FIG. 1.

[3-2. Operation Flow]

Figure 5:
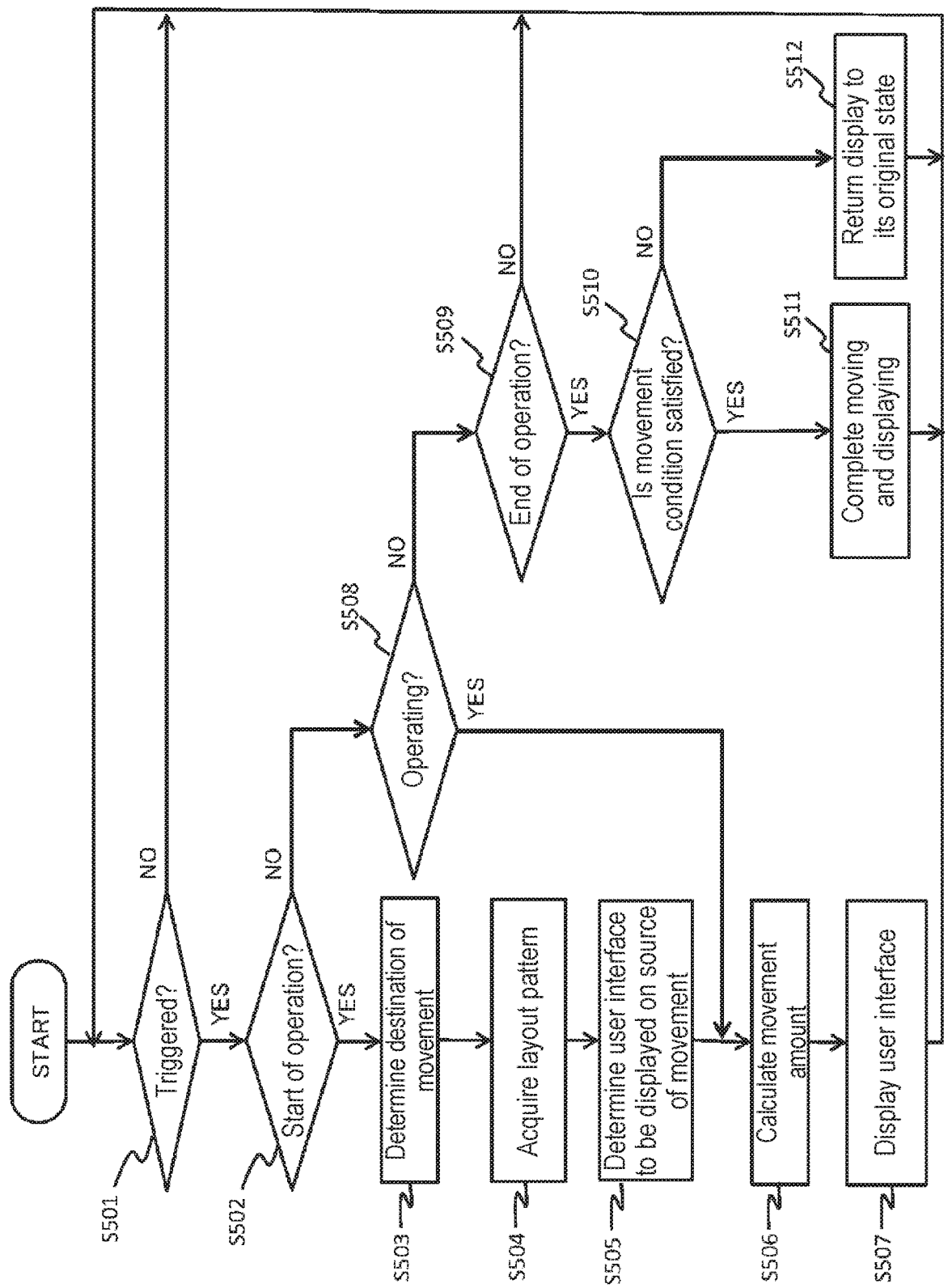
FIG. 5 is a flowchart illustrating an operation of the display system according to the first exemplary embodiment of the present disclosure.

FIG. 5 is a flowchart illustrating an operation of the display system according to the first exemplary embodiment. Here, description will be provided assuming that one of the display units, i.e., first display unit 103, serves as a source of movement, while another one of the display units, i.e., second display unit 104, serves as a destination of movement. Herein, an operation denotes an operation of causing, when a user interface for application 1 is displayed on first display unit 103, second display unit 104 to display the user interface for application 1.

In the standard state, CPU 101 determines whether an input (trigger) on a display operation is accepted (step S501). When determining that an input is accepted, the operation proceeds to step S502. When determining that no input is accepted, CPU 101 repeats step S501.

When determining in step S501 that an operation input is accepted, CPU 101 determines whether the accepted operation input is indicative of start of the operation (step S502). When CPU 101 determines that the accepted operation input is indicative of the start of the operation, the operation proceeds to step S503. When determining that the accepted operation input is not indicative of the start of the operation, the operation proceeds to step S508.

In step S503, CPU 101 detects, through the accepted operation input, first display unit 103 on which a display operation of moving a user interface being displayed for an application is performed, and a movement direction of the display operation. CPU 101 determines, based on the installation position of first display unit 103 and the movement direction of the display operation, second display unit 104 as a destination of movement of the user interface to be displayed for application 1. the operation proceeds to step S504.

In step S504, as a content being displayed on first display unit 103 is application 1, and the destination of movement is second display unit 104, CPU 101 uses the layout table stored in CPU 101 to acquire a second layout pattern representing a layout pattern for a second user interface to be displayed on the second display unit. CPU 101 uses the second layout pattern to generate the second user interface to be displayed for application 1 on second display unit 104. The operation proceeds to step S505.

In step S505, CPU 101 determines a fourth user interface to be displayed on first display unit 103. The operation proceeds to step S506. CPU 101 may determine a default user interface as the fourth user interface. A user interface displayed before the first user interface is displayed may be determined as the fourth user interface.

In step S506, based on the attributes of first display unit 103 and second display unit 104, CPU 101 calculates a first movement amount used to move and display the first user interface on first display unit 103, and a second movement amount used to move and display the second user interface on second display unit 104. CPU 101 proceeds to step S507. How to calculate a movement amount will be described later.

In step S507, CPU 101 causes first display unit 103 and second display unit 104 to respectively move and display the first user interface and the second user interface by the first movement amount and the second movement amount. The operation returns to step S501. At this time, as the first user interface moves in the movement direction, first display unit 103 displays in a duplicated manner the fourth user interface determined in step S506. The second display unit displays the third user interface so that, as the first user interface moves from the first display unit, a display region of the third user interface shrinks.

In step S508, CPU 101 determines whether the operation content is an in-operation. When determining that the operation content is the in-operation, the operation proceeds to step S506. After calculating a movement amount, CPU 101 causes the user interfaces to be kept moved and displayed. The operation returns to step S501. When CPU 101 determines in step S508 that the operation content is not the in-operation, the operation proceeds to step S509.

In step S509, CPU 101 determines whether the operation content is an end-of-operation. When determining that the movement content is the end-of-operation, the operation proceeds to step S510. When determining that the movement content is not the end-of-operation, the operation returns to step S501.

In step S510, CPU 101 determines whether a movement condition is satisfied (step S510). When determining that the movement condition is satisfied, the operation proceeds to step S511. When determining that the movement condition is not satisfied, the operation proceeds to step S512.

As for the movement condition, the movement condition may be determined to be satisfied when a user operation has caused the first user interface being displayed to move, and a position after movement from a location of start of the operation at a source of movement to a present location is equal to or above a predetermined threshold. For example, the condition is determined to be satisfied when a position at a center in an upper-lower direction of first display unit 103 is specified as the threshold, and an upper part of the first user interface is moved to a position below the center of first display unit 103. In this case, when the position after movement is below the threshold, first display unit 103 and second display unit 104 return to the standard state.

In step S511, CPU 101 completes moving and displaying. The operation returns to step S501. For example, transition curves indicative of transitions of the first movement amount and the second movement amount are stored in memory 102. CPU 101 uses the transition curves to move and display the user interfaces. For example, a transition curve may be a curve where, as displaying proceeds toward completion, amounts of change in the first movement amount and the second movement amount reduce. As moving and displaying complete, first display unit 103 displays the fourth user interface, and second display unit 104 displays the second user interface.

In step S512, CPU 101 determines that no movement operation is performed. CPU 101 causes the display to return to its original state. The operation returns to step S501. In this case, CPU 101 causes first display unit 103 to display the first user interface, and causes second display unit 104 to display the third user interface. At this time, the transition curves described above may be used to allow the first user interface and the third user interface to respectively return to and appear on first display unit 103 and second display unit 104.

[3-3. Movement Amount]

Movement amounts will be described with reference to FIGS. 6 to 8. FIGS. 6 to 8 are views for describing relationships between resolution and movement amounts on the display units.

In FIG. 6, attributes such as shape of display unit (vertical type or horizontal type), resolution, and inch count of first display unit 601 and second display unit 602 are identical to each other. At this time, as illustrated in FIG. 6, here is addressed an operation of moving and displaying user interface 603 displayed on first display unit 601 to and on second display unit 602. Here, as for a positional relationship between first display unit 601 and second display unit 602, it is assumed that first display unit 601 lies above second display unit 602. Here, it is also assumed that movement amounts of the user interfaces being displayed are identical to each other.

When a user performs an operation of moving and displaying user interface 603 being displayed on first display unit 601 to and on second display unit 602, user interface 603 being displayed on first display unit 601 moves downward, and user interface 604 appears from an upper part of second display unit 602. In this case, first display unit 601 and second display unit 602 are identical to each other in resolution. Therefore, at a timing when user interface 603 disappears from first display unit 601, moving and displaying of user interface 604 to second display unit 602 completes.

On the other hand, as illustrated in FIG. 7, when first display unit 701 and second display unit 702 differ from each other in attribute, and when the operation described above is performed with a movement amount identical to the movement amount of the operation described above, at a timing when user interface 703 disappears from first display unit 701, moving and displaying of user interface 704 to second display unit 702 has not yet completed. Meanwhile, in the middle phase, the movement amounts differ from each other on the whole display units. Therefore, the user feels uncomfortable.

In the present disclosure, as illustrated in FIG. 8, when first display unit 801 and second display unit 802 differ from each other in attribute, movement amounts of user interfaces being displayed respectively on first display unit 801 and second display unit 802 are calculated so as to synchronize with each other a timing when user interface 803 disappears from first display unit 801 and a timing when moving and displaying of user interface 804 to second display unit 802 completes. For example, when resolution in a vertical direction of second display unit 802 is twice resolution in the vertical direction of first display unit 801, a movement amount on second display unit 802 is set to twice a movement amount on first display unit 801.

4. Specific Example

FIGS. 9A to 9D are views for describing a specific example of a movement operation on the display system according to the first exemplary embodiment.

FIGS. 9A to 9D each illustrate, on an upper side, display device 201 (first display unit 103), and, on a lower side, display device 202 (second display unit 104).

Figure 9A:
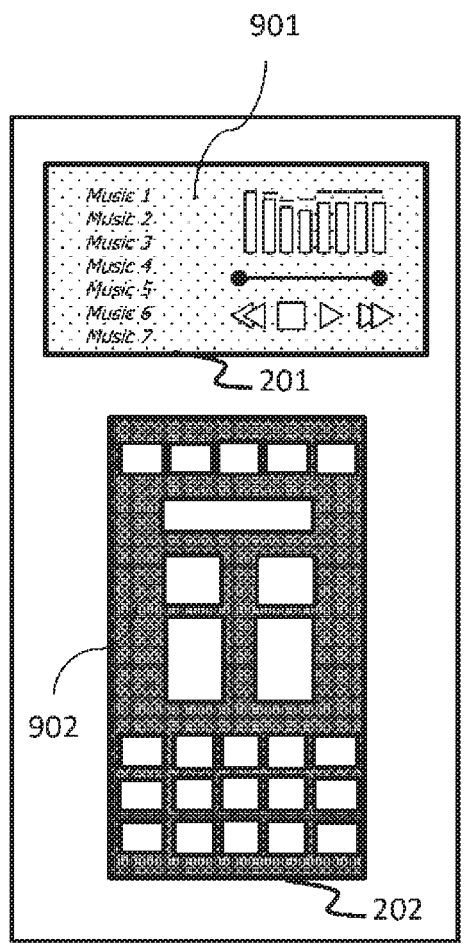
FIG. 9A is a view for describing a specific example of an operation on the display system according to the first exemplary embodiment of the present disclosure.
Figure 9B:
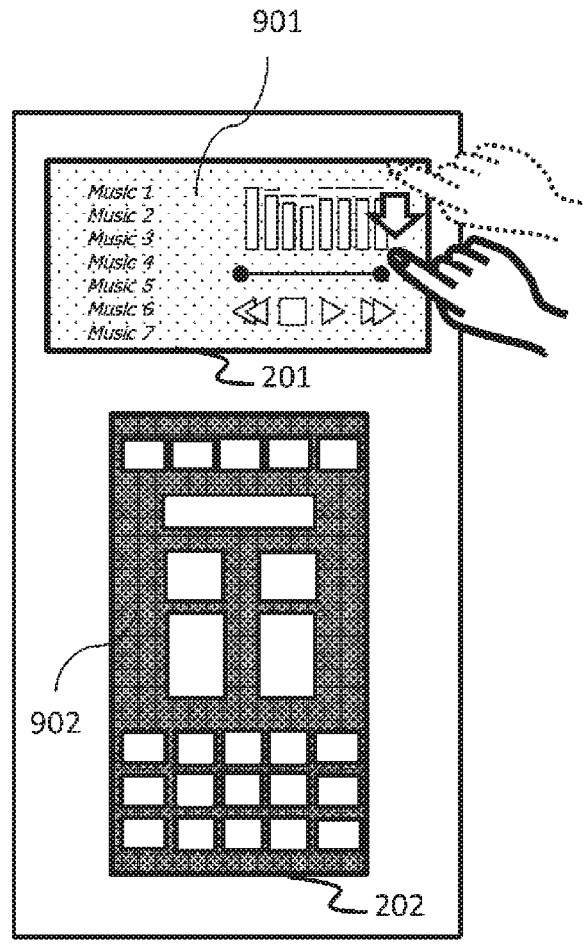
FIG. 9B is a view for describing the specific example of the operation on the display system according to the first exemplary embodiment of the present disclosure.

FIG. 9A illustrates display device 201 and display device 202 before start of a movement operation. FIG. 9B illustrates display device 201 and display device 202 at a time of the start of the movement operation. FIG. 9C illustrates display device 201 and display device 202 while user 108 is keeping the movement operation. FIG. 9D illustrates display device 201 and display device 202 at a time of end of the movement operation.

As illustrated in FIG. 9A, before start of a movement operation, display device 201 displays user interface 901 (first user interface) for a player application (application 1). Display device 202 displays user interface 902 (third user interface) for a default menu (application 2). User interface 901 is a user interface generated for the first application by CPU 101 with layout 1-1 in accordance with the layout table in FIG. 3. Similarly, user interface 902 is a user interface generated for the second application by CPU 101 with layout 2-2.

Next, as illustrated in FIG. 9B, user 108 places his or her finger on the screen of display device 201, and moves the finger downward. This represents a movement operation instructing that user interface 901 being displayed is moved to a lower display device, i.e., display device 202.

At this time, a content of the display operation is a downward movement operation. The display unit having performed the operation is display device 201. The user interface being moved and displayed is user interface 901. CPU 101 accepts the information.

With the downward movement operation performed on display device 201, CPU 101 determines that a destination of movement is display device 202.

CPU 101 uses the layout table in FIG. 3 to acquire a layout pattern to be used on display device 202 for application 1. In this case, the layout pattern to be used on display device 202 for application 1 is layout 1-2 illustrated in FIGS. 3 to 4B.

Based on attributes such as resolution of display device 201 and display device 202, CPU 101 calculates a first movement amount and a second movement amount respectively representing movement amounts used to display user interfaces 901, 904 on display device 201 and display device 202.

CPU 101 determines a fourth user interface to be displayed on display device 201 that is the source of movement. In this case, here, it is assume that, before display device 201 displays user interface 901, display device 201 has displayed user interface 903 representing a car navigation. CPU 101 acquires from the layout table in FIG. 3 a layout pattern for user interface 903 to be displayed on display device 201. In this case, the layout pattern is layout 3-1.

As illustrated in FIG. 9C, CPU 101 causes user interface 901 to move and appear from display device 201 to display device 202. In this case, CPU 101 causes user interface 901 to move and appear by the first movement amount. As user interface 901 being displayed moves by the first movement amount on display device 201, CPU 101 causes user interface 903 being displayed to appear from a top by the first movement amount. User interface 903 is the fourth user interface for application 3, a layout pattern of which is generated by CPU 101 with layout 3-1.

On the other hand, CPU 101 causes display device 202 to move and display, by a second movement amount, user interface 904 generated for application 1 by CPU 101 with a layout pattern of layout 1-2. At this time, a display region of user interface 902 shrinks by the second movement amount from the top. A movement amount will be repeatedly calculated, as well as contents will repeatedly move and appear until a movement operation completes.

As described above, as user interface 901 being displayed moves downward on display device 201, user interface 904 being displayed moves downward from the top on display device 202. As a result, user 108 can visually understand that the user interface being displayed for application 1 moves from display device 201 to display device 202. The user can also visually understand, on display device 202, that layout and functions provided for the user interface for application 1 are changed.

As the movement operation completes, as illustrated in FIG. 9D, display device 201 displays user interface 903, and display device 202 displays user interface 904.

5. Summary

In the vehicle display system according to the first exemplary embodiment, memory 102 stores the layout table with display units, applications, and layout patterns that are used when the user interfaces are displayed on the display units being associated to each other. CPU 101 uses the layout table to create a user interface to be displayed on one of the display units. While first display unit 103 is caused to display a first user interface created with a first layout pattern for a first application, when a display operation of moving the user interface for the first application to second display unit 104 is performed, CPU 101 creates, with a second layout pattern for the first application, a second user interface to be displayed on second display unit 104. CPU 101 determines, based on the attributes of first display unit 103 and the attributes of second display unit 104, a first movement amount used to move and display the first user interface on first display unit 103, and a second movement amount used to move and display the second user interface on second display unit 104. CPU 101 causes the first user interface to move and appear at the first movement amount on first display unit 103, and causes the second user interface to move and appear at the second movement amount on second display unit 104.

Therefore, functions available from application 1 in accordance with first display unit 103 and the second display unit can be displayed, as well as a timing when the first user interface being displayed fully disappears from first display unit 103, and a timing when the second user interface being displayed fully appears on second display unit 104 can be synchronized with each other.

Therefore, when a user interface being displayed is moved between display devices, the user interface can move and appear smoothly and seamlessly.

Other Exemplary Embodiments

The first exemplary embodiment has been described above as an example of the technique disclosed in the present application. However, the technique in the present disclosure is not limited thereto, and can also be applied to exemplary embodiments subjected to modification, substitution, addition, omission and the like. A new exemplary embodiment can also be made by a combination of the components of the first exemplary embodiment.

Here, other exemplary embodiments will be described.

In the movement and display operation described in the first exemplary embodiment, first display unit 103 is operated, and a user interface displayed on first display unit 103 moves to and appears on second display unit 104. However, second display unit 104 may be operated, and a user interface displayed on second display unit 104 may move to and appear on first display unit 103.

When a display operation is entered, a direction in which a finger moves on a screen may indicate a destination of a user interface to be displayed. For example, to move a screen from a display device for a driver's seat or a passenger seat to a display device for a rear seat, downward movement of a finger may be performed. On the contrary, to move a screen from a rear display device to a front display device, upward movement of a finger may be performed. Further, operation buttons corresponding to the respective display operations may be displayed on display screens of the display devices. Alternatively, the display devices may be provided with operation buttons.

In FIG. 2, the example display system including the two display units, and the two operating units has been described. However, a display system may include three or more display units, and three or more operating units.

Figure 10B:
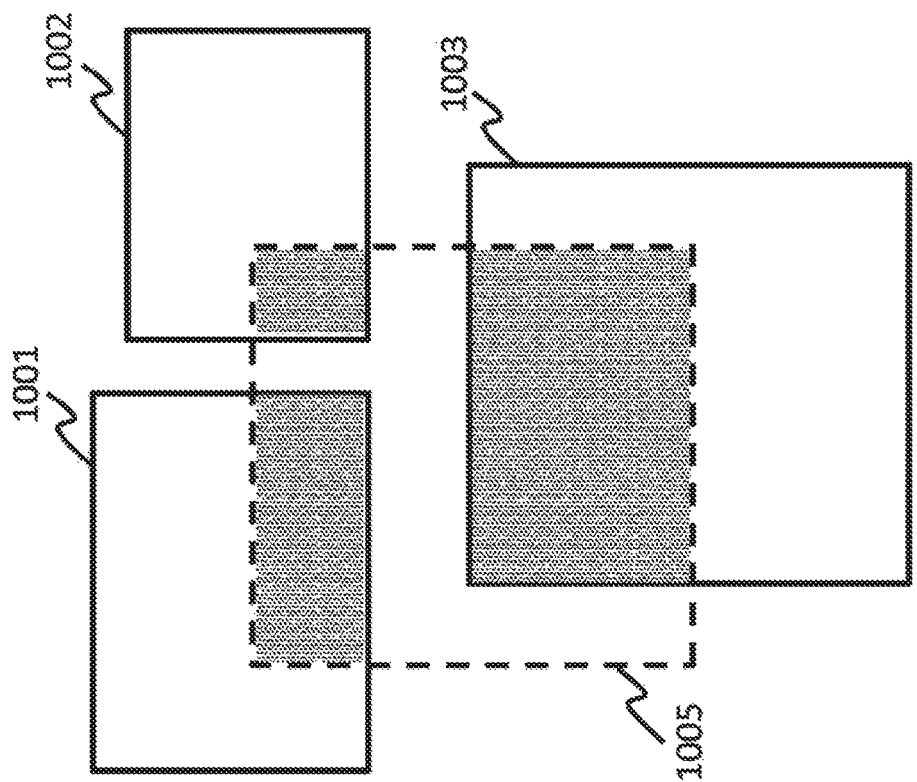
FIG. 10B is a view for describing the specific example of the operation of the display system according to the other exemplary embodiment of the present disclosure.
Figure 10A:
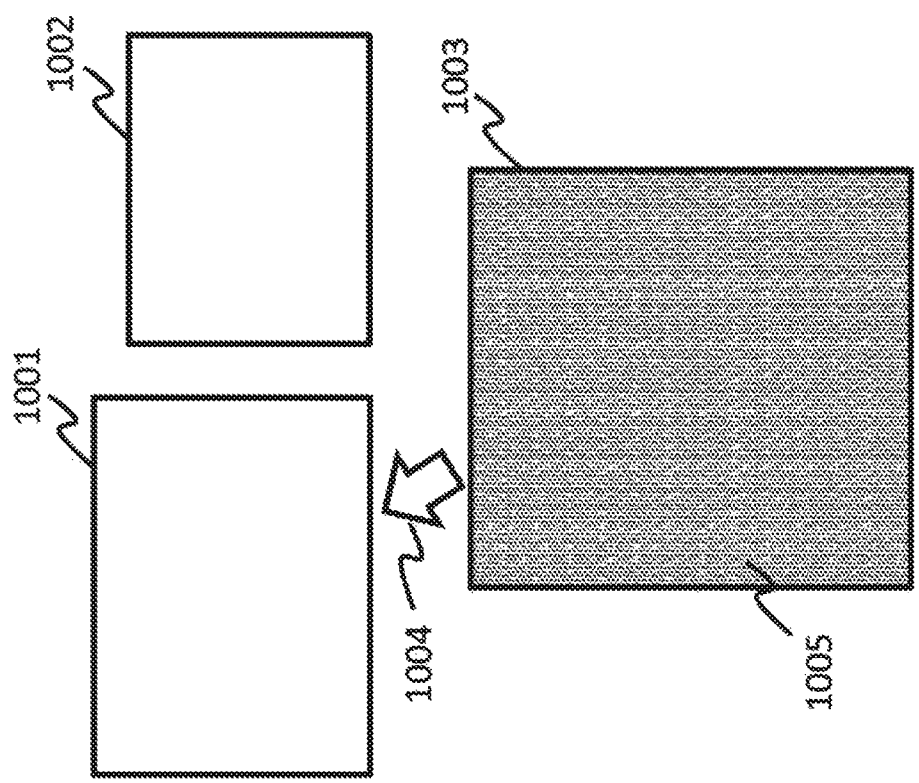
FIG. 10A is view for describing a specific example of an operation of a display system according to another exemplary embodiment of the present disclosure.

FIGS. 10A and 10B each illustrate a display system including three display units, and three operating units. In FIGS. 10A and 10B, the display system includes three display devices 1001 to 1003. First, as illustrated in FIG. 10A, here, it is assumed that, while user interface 1005 for an application stored in display device 1003 is displayed, a user performs a movement operation toward display device 1001. In this case, as illustrated in FIG. 10B, while the movement operation is performed, display device 1002 that is not a destination of movement may display a part of user interface 1005 depending on a size of display of user interface 1005. The display devices each display a part of a user interface with a layout pattern conforming to each of the display devices. By performing displaying as described above, a user can intuitively know how a user interface moves.

When three or more display units and three or more operating units are available, one or two of the display units and one or two of the operating units may constitute one unit, and a plurality of the units may be disposed. CPUs 101 in the units may communicate with each other to achieve the operations of the present disclosure. For example, the units may be arranged around a front seat and a rear seat in the vehicle one by one, and the respective CPUs 101 in the units may communicate with each other.

CPUs 101 may be different electrical control units (ECUs) mounted on a vehicle. The plurality of ECUs include one main-ECU and one or more sub-CPUs. The main-ECU may retain a layout table, and may be configured to send contents to be forwarded to the sub-ECUs, as well as to send layout information including positions at which user interfaces configured to display the contents are cut out and displayed.

Figure 11:
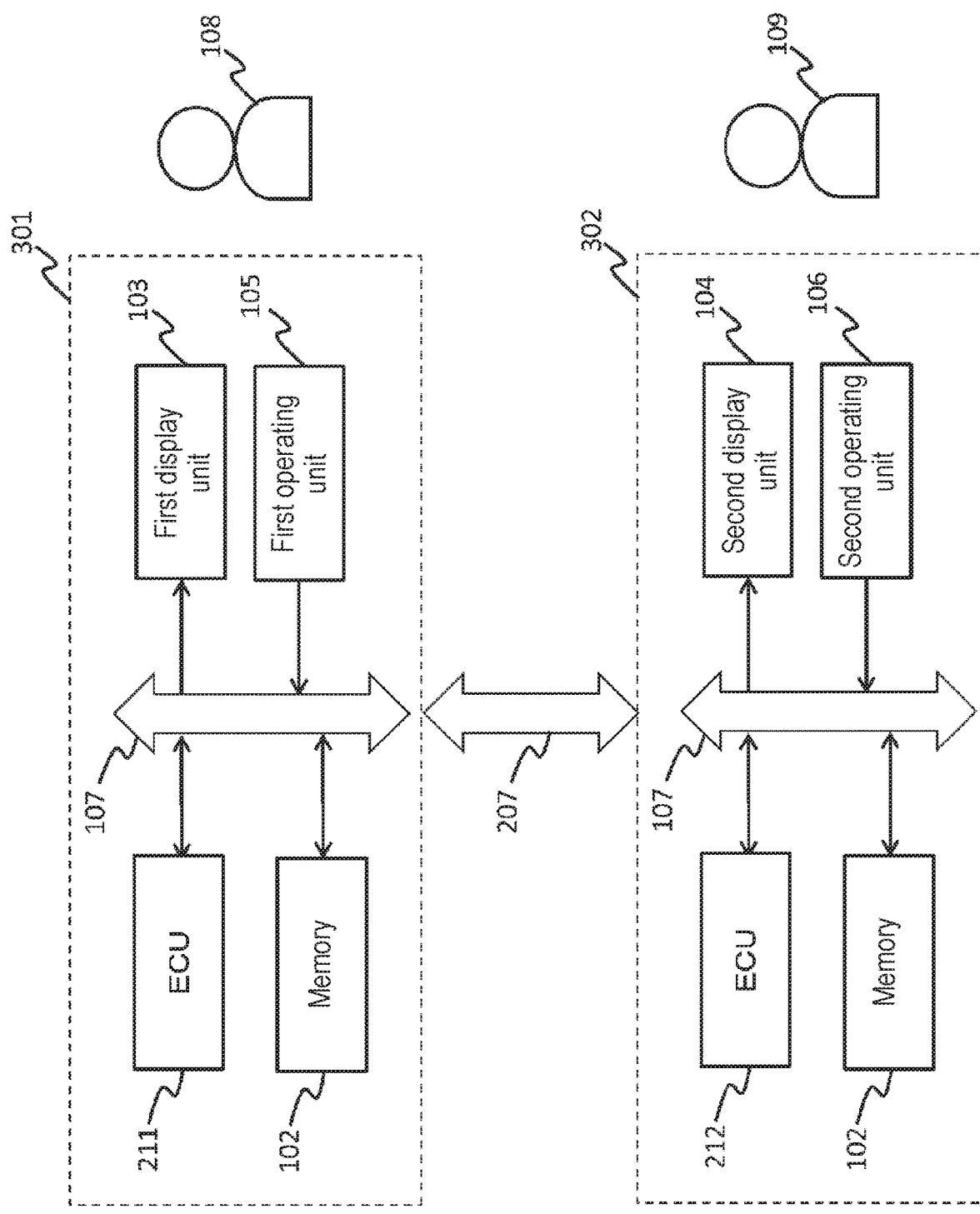
FIG. 11 is view illustrating an example when a CPU of a display system according to still another exemplary embodiment of the present disclosure is an ECU.

FIG. 11 illustrates an example when one of CPUs 101 is an ECU. In FIG. 11, it is to be noted that like reference numerals designate identical or corresponding components in FIG. 2, and descriptions will be omitted. In FIG. 11, unit 301 includes first display unit 103 and first operating unit 105. ECU 211 is configured to control first display unit 103 for displaying. Unit 302 includes second display unit 104 and second operating unit 106. ECU 212 is configured to control second display unit 104 for displaying. In FIG. 11, ECU 211 serves as a main-ECU. ECU 212 serves as a sub-ECU. ECU 211 retains a layout table. When user 108 performs an operation of moving a user interface displayed on first display unit 103 to second display unit 104, a content to be displayed on second display unit 104 and layout information are sent via transmission path 207 to ECU 212. ECU 212 causes second display unit 104 to display, in accordance with the layout information, a user interface displaying the content received from ECU 211. User 109 can view, through second display unit 104, the content moved from first display unit 103. Here, it is assumed that transmission path 207 is a local area network (LAN), for example. However, transmission path 207 may be a controller area network (CAN), or a media oriented system transport (MOST), for example. FIG. 11 describes a case when the two ECUs are used. However, three or more ECUs may be used. In that case, similar operations take place between one of the ECUs, which controls a display unit serving as a source of movement and displaying a user interface, and another one of the ECUs, which controls a display unit serving as a destination of movement and displaying the user interface.

In the first exemplary embodiment, as a movement operation ends, first display unit 103 displays the default user interface or a user interface displayed before the first user interface is displayed. However, first display unit 103 may display nothing.

INDUSTRIAL APPLICABILITY

The present disclosure effectively displays and controls a display system including a plurality of display devices.

REFERENCE MARKS IN THE DRAWINGS

100: display system
101: CPU (controller)
102: memory
103, 601, 701, 801: first display unit
104, 602, 702, 802: second display unit
105: first operating unit
106: second operating unit
107, 207: transmission path
108, 109: user
200: vehicle
201, 202, 1001, 1002, 1003: display device
301, 302: unit
401, 402, 403, 404: part
603, 604, 703, 704, 803, 804, 901, 902, 903, 904, 1005: user interface

The invention claimed is:

1. A display system comprising:
a first display unit having first attributes;
a second display unit having second attributes different from the first attributes;

an application;

a layout table that stores a first layout pattern in association with which of a plurality of functions included in the application is displayed at which position on a first user interface, the first layout pattern being used to display the first user interface on the first display unit, and a second layout pattern in association with which of a plurality of functions included in the application is displayed at which position on a second user interface different from the first user interface, the second layout pattern being used to display the second user interface on the second display unit; and a controller configured to use the layout table to create with the first layout pattern a first content, and, while the first content is displayed in the first user interface on the first display unit, when a display operation of moving the first user interface to the second display unit is performed, to use the layout table to create with the second layout pattern a second content used to display the second user interface on the second display unit, to determine, based on the first attributes of the first display unit and the second attributes of the second display unit, a first movement amount used to move and display the first user interface on the first display unit, and a second movement amount used to move and display the second user interface on the second display unit, and to cause the first user interface to move and disappear at the first movement amount on the first display unit, and the second user interface to move and appear at the second movement amount on the second display unit, wherein the controller is configured to calculate the first movement amount being displayed on the first display unit and the second movement amount different from the first movement amount being displayed on the second display unit, based on the first attributes and the second attributes, such that a timing when the first user interface disappears from the first display unit and a timing when moving and displaying of the second user interface to the second display unit completes, are synchronized with each other.

2. The display system according to claim 1, wherein the display operation is to be performed through the first display unit.

3. The display system according to claim 1, wherein the display operation is to be performed while a third content created with a third layout pattern is displayed in the second user interface on the second display unit.

4. The display system according to claim 1, wherein the first display unit and the second display unit differ from each other in specification on display.

5. The display system according to claim 1, wherein the attributes include at least any of resolution, shape, and inch count.

6. The display system according to claim 1, wherein the first layout pattern and the second layout pattern differ from each other in a function number of functions to be provided by the application and arrangement of user interface parts indicative of the functions.

\* \* \* \* \*